May 15, 1951     J. W. JARRETT ET AL     2,553,094
FLOOR LAMP
Filed June 21, 1947                                2 Sheets-Sheet 1
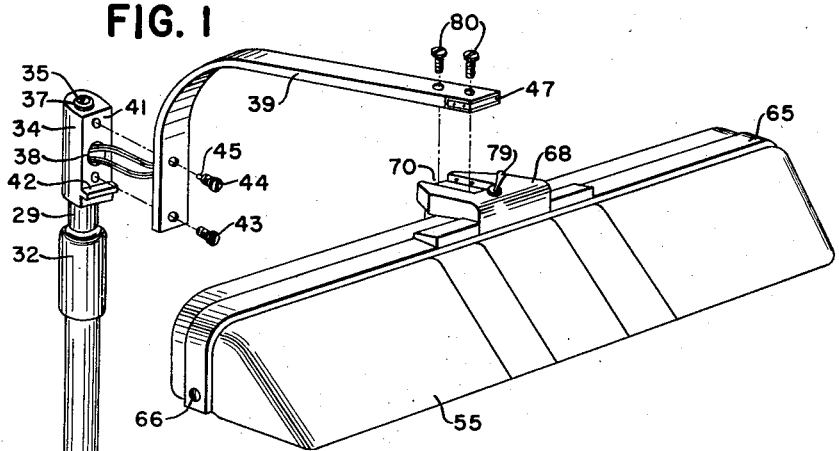
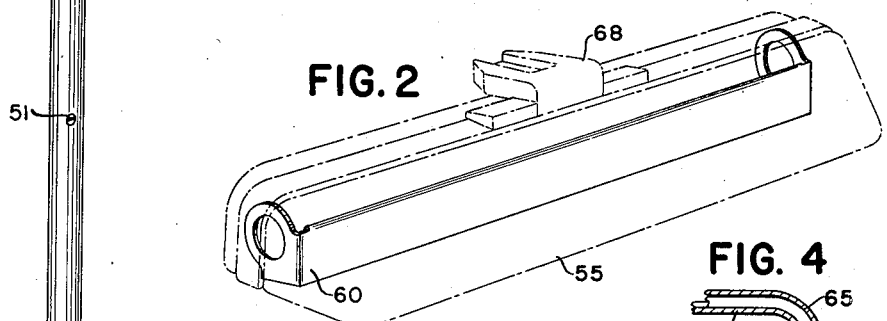
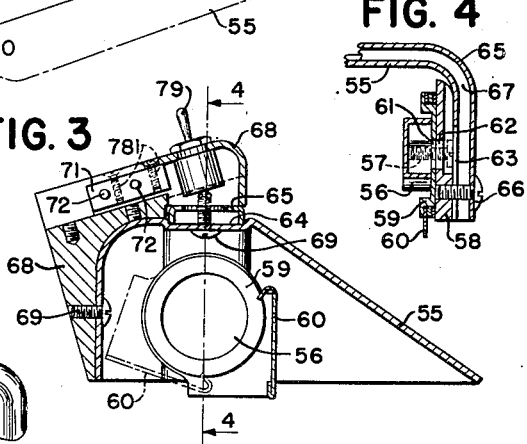
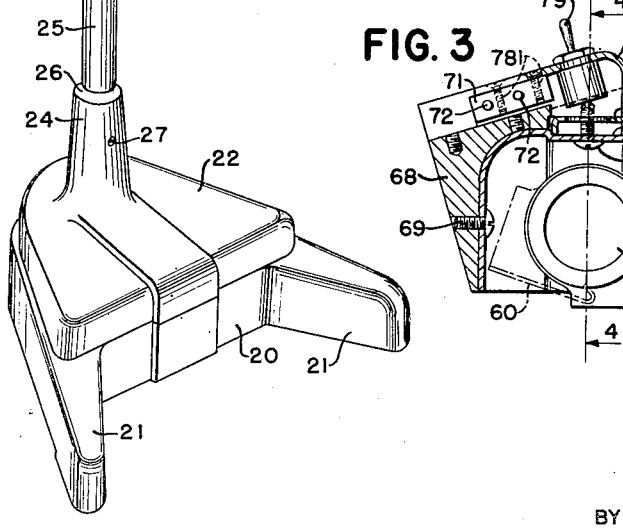
Inventors
JOHN W. JARRETT &
VINCENT MATERESE
BY Carl Benst
THEIR Attorney May 15, 1951  J. W. JARRETT ET AL  2,553,094
FLOOR LAMP
Filed June 21, 1947 2 Sheets-Sheet 2
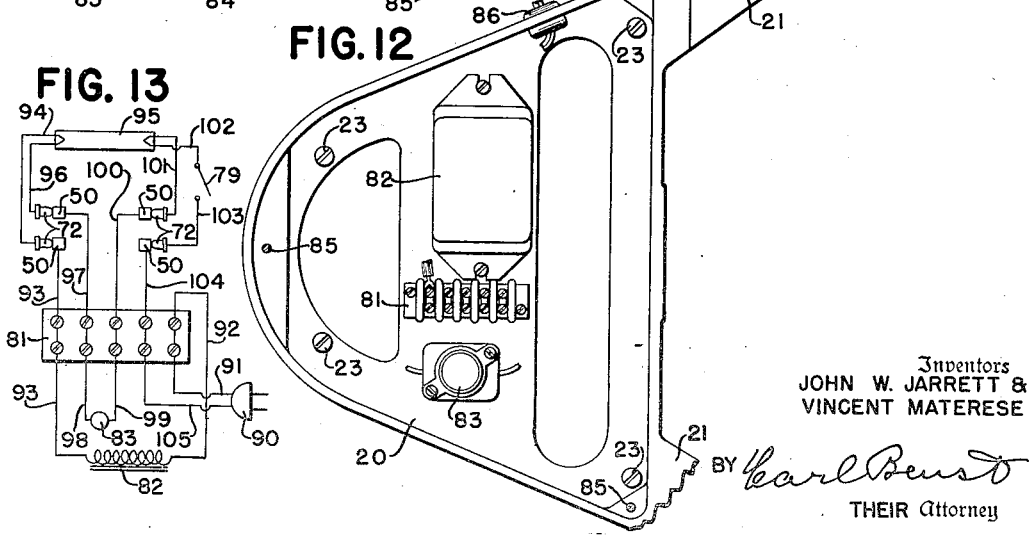
Inventors
JOHN W. JARRETT &
VINCENT MATERESE
BY Carl Benst
THEIR Attorney

UNITED STATES PATENT OFFICE 2,553,094

FLOOR LAMP

John W. Jarrett, Dayton, and Vincent Materese, Oakwood, Ohio, assignors to The National Cash Register Company, Dayton, Ohio, a corporation of Maryland Application June 21, 1947, Serial No. 756,146

2 Claims. (Cl. 240—81)

This invention relates to improvements in floor lamps.

The principal object of the invention is to provide a novel floor lamp for use with business machines, such as accounting machines, typewriters, etc.

Another object of the invention is to provide a floor lamp which is adjustable in height, as well as in radial direction, to properly position the lamp in relation to the keyboard of a business machine or typewriter.

A specific object of the invention is to provide a novel means for maintaining an adjustable floor lamp in proper height.

Another object of the invention is to provide a floor lamp having a relatively tall stand with a heavy base, to prevent tipping of the lamp.

Another object of the invention is to provide a floor lamp having a fluorescent illuminating means with a hollow base for supporting the starting switch and the ballast.

A specific object of the invention is to provide an adjustable floor lamp having a detachable lamp shade which is self-contained, so that it may be removed for shipping, and when set up for use the lamp shade is connected electrically to the source of electric power by simply attaching the shade to the bracket on the floor lamp stand.

Another object of the invention is to provide a novel eye shield within the lamp shade.

A still further object of the invention is to provide an adjustable floor lamp having a swinging bracket or arm for positioning the illuminating means over the work at the desired position and being so constructed that the swinging arm at its free end is provided with electrical terminals which are so positioned in relation to the corresponding electrical terminals on the lamp shade assembly, so that attaching the lamp shade to the free end of the swinging arm completes the electrical circuit to the power means.

A still further specific object of the invention is to provide a self-contained lamp shade with a novel channel construction for receiving electric wires for forming a connection between terminal means on the lamp shade assembly and the power means.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Fig. 1 is a perspective view, shown disassembled, of the floor lamp.

Fig. 2 is a phantom view of the lamp shade, illustrating the eye shield in full lines in its relation to the lamp shade.

Fig. 3 is a sectional view through the center of the lamp shade and looking toward the right.

Fig. 4 is a detail view of the means for supporting the illuminating means and the adjustable eye shield taken on line 4—4 of Fig. 3, looking in the direction of the arrows.

Fig. 5 is a sectional view taken through the stand shown broken away at two places.

Fig. 6 is a sectional view taken on line 6—6 of Fig. 5.

Fig. 7 is a sectional view taken on line 7—7 of Fig. 5.

Fig. 8 is a perspective view of the bracket for supporting the spring actuated terminal means mounted on the lamp shade.

Fig. 9 is a detail view in perspective of the electrical terminal block supporting means carried by the swinging arm of the floor lamp.

Fig. 10 is an exploded view showing the construction of the spring-actuated terminals carried by the bracket shown in Fig. 8.

Fig. 11 is a perspective view showing the construction of the free end of the swinging arm of the floor lamp.

Fig. 12 is a view looking at the bottom of the base of the floor lamp.

Fig. 13 is a wiring diagram for the lamp.

General description

The floor lamp disclosed herein is provided for use with an accounting machine, typewriter or other business machine. In order to provide a floor lamp which may be readily adjusted to various heights and having a relatively long swinging arm for supporting the illuminating means, a heavy base is provided, having angularly projecting feet to provide for proper balancing of the lamp. The lamp stand is made of telescoping tubes to provide for adjusting the stand in a vertical direction to position the lamp illuminating means at the proper height, depending upon the machine being worked on. A clamping means is provided to maintain the telescoping stand in its proper adjusted position. The upper end of the stand is provided with a bearing to support a rotating bracket which may be adjusted within the limits of a stop provided thereon to bring the illuminating means into the proper relationship sidewise to suit the particular operator or her work. The brackets are made in a number of different lengths and heights to provide further choice adjustment in locating the light in relation to the work, or size of machine with which it is to be used. The lamp shade is provided with an eye shield which is located on the under side of the lamp shade and which may readily be adjusted in accordance with the angle at which the operator is sitting in relation to the illuminating means.

A lamp for use with business machines or a typewriter is very large and bulky, in order to be readily adjustable to any desired position. For this reason the shipment of such lamp becomes a problem, which problem is uniquely solved by the knock-down construction herein illustrated. To implement this knock-down construction the base and upright member, together with the swivel bracket are completely wired and the wires are connected at the outer end of the bracket by fixed terminal contacts. The lamp shade itself is of a novel construction in that it is a self-contained unit, fully wired, together with a switch for controlling the circuits through the illuminating means and provided with a bracket containing a plurality of electrical terminals which are located to register with the electrical terminals on the bracket. In preparing the lamp for shipment the lamp shade is disconnected from the bracket by removing two screws. The bracket itself is also disconnected from the lamp stand by removal of two screws. The wire for completing the electric current to the terminals on the end of the bracket is given sufficient slack so that when the bracket is loosened from the stand it can be tied on the post of the main lamp base and the lamp shade itself can be shipped as a separate unit. When assembling the lamp after reaching its destination, all that is necessary is to attach the bracket to the main lamp base by two screws and attaching the lamp shade unit to the free end of the bracket by two screws. No additional electrical connections are required inasmuch as the electrical terminals on the end of the bracket and those in the lamp shade assembly are arranged to register with each other to complete the circuit the instant the lamp shade is attached to the bracket.

The novel construction of having a self-contained lamp shade, which carries its own electrical contacts forms an important feature of the novel invention herein disclosed. The lamp shade assembly includes a fluorescent light tube which is attached to brackets, one on each end of the shade itself. A U-shaped saddle is bent around to fit the top and the two sides of the lamp shade and are provided with openings for receiving the wires for the electric connections which are brought up and around the channel formed by the U-shaped bracket to an opening in the center thereof where they connect with terminal blocks on the top side of the shade. A control switch for turning the light on and off is also provided on the lamp shade itself. Providing the U-shaped channel on the lamp shade results in a lamp shade assembly in which all the electric connections are hidden from view, and after the lamp shade assembly is attached to the adjustable bracket on the lamp stand, no wires are visible except that provided for an outlet at the base thereof.

The novel construction of the lamp stand and the unit assembly of the lamp shade provides a floor lamp not only rugged in construction but also neat in appearance. The novel system of wiring the lamp shade and the lamp stand also provides for a minimum of danger or damage to the electrical wiring of the lamp, since the entire wiring system is at all times protected and hidden from view.

*Detailed description*

The lamp is supported on a base 20 (Figs. 1 and 5) having forwardly projecting legs or feet 21 extending at an angle sufficient to provide for the non-tilting of the lamp in any angular position to which the lamp shade bracket may be adjusted. Mounted on the main base 20 is a sub-base 22, which is held to the main base 20 by four screws 23, which screws pass through the main base 20 and into threaded openings in the sub-base 22, the sub-base having suitable lugs and tapped holes therein. The sub-base 22 is provided with an upwardly extending section 24 to receive an upright tubular post or member 25. To properly locate the upright member 25 in the sub-base 22, a collar 26 is brazed on the outer periphery thereof, which forms a seat for the member 25 when inserted into the extension 24. The lower end of the member 25 is threaded to receive a nut 26 for securing the member 25 in the extension 24. A set screw 27 is provided to form additional stability to the assembly after the screw 26 has been securely fastened, the set screw acting to prevent rotary movement of the member 25.

The upper end of the member 25 has a threaded collar 28 brazed thereon, which collar forms one part of a clamping device for clamping the adjustable stand in any position within the extent of its adjustment. A post 29, the outside diameter of which is of such size that it has a sliding fit within the member 25. Before assembling the post 29 in the member 25, a three-piece split ring collar 30 is positioned to rest on the top of the member 25 and a threaded collar 28. The split ring 30 is provided with a camming edge 31 which coacts with a similar camming edge on the clamping collar 32. The clamping collar 32 is provided with internal threads to engage with the external threads of the threaded ring 28. After the post 29 is in the adjusted position, the clamping collar 32 is turned to tighten the split ring 31 against the post 29.

The upper end of the post 29 is provided with a bearing 33 (Figs. 5 and 6) which bearing is brazed to the upper end of the post 29. A cap 34 has an opening thereon to fit over the bearing 33, so as to be free to rotate thereon. The cap 34 is held in position on the bearing 33 by a screw 35 adapted to enter a nut 36 on the under side of the bearing 33. A washer 37 provides a means for firmly supporting the collar 34 on the bearing 33.

The cap 34 is provided with an enlarged opening 38 (see Fig. 1), which registers with a similar opening in the post 29 to provide for threading the electrical wires through the post 29 and into a swinging bracket 39. The swinging bracket 39 is hollow, being made of an oblong-shaped piece of metal, as clearly shown in Fig. 11. An opening is provided in the bracket 39, opposite the opening 38 to permit the wires that form the electric connections to enter into the hollow interior of the bracket 39. An insulating grommet 40 (Fig. 5) is inserted into the opening in the bracket 39, and which extends through the opening 38 and into the hollow interior of the post 29 to provide a protecting means for the wires that pass therethrough.

The collar 34 is provided with a flat face 41 (see Fig. 1), and with a ledge 42 near the lower end of the flat face 41 to support the bracket 39. The bracket 39 is attached to the collar 34 by means of screws 43 and 44, which screws pass through an opening in the bracket and are threaded through openings in the collar 34.

The upper screw 44 for attaching the bracket to the collar 34 is provided with an unthreaded extension 45 which when the screw is firmly seated in position projects into a cut-away 46 notch in the bearing 33. The stud 45 projecting into the cut-away portion 46 of the bearing 33 provides a limiting means for swinging the bracket 39 in a horizontal plane.

The free end of the bracket 39 is notched as shown in Fig. 11 to receive an insulating contact block 47 (Figs. 1 and 9). The block 47 is shouldered as at 48 to form a locating means for the contact block in the bracket 39. When the shoulders 48 come in contact with the edges 49 (Fig. 11) of the free end of the bracket 39, the contact block is in proper position, where it is held by friction, until the shade assembly is attached to the bracket which maintains the contact block firmly in position, in the manner hereinafter described.

The stand above described in detail is assembled in a separate unit and shipped as such, apart from the lamp shade assembly to be hereinafter described.

A screw 51 having a rounded terminal is positioned in the upright support 25 and the terminal projects into a slot 52 in the adjustable post 29 to provide upward and downward limits of movement for the post 29.

Lamp shade assembly

The lamp shade assembly is a self-contained unit which is completely wired and also carries the switch for controlling the electric current, and the mere assembling of the lamp shade assembly to the swinging bracket 39 completes the contact with the current supply furnished through the lamp stand.

A lamp shade 55 is formed in any suitable form required by the type of illuminating means to be used therein. As illustrated herein, a fluorescent light tube is used. Secured at each end of the lamp shade 55 is a bracket 56 for supporting the fluorescent tube. The brackets 56 are secured to the lamp shade 55 by screws 57 which pass through an insulating plate 58 and through a bracket 59, forming pivoting brackets for an eye shade 60. The bracket 59 and the insulating bracket 58 are provided with openings 61 and 62, respectively, which register with an opening 63 in the lamp shade 55. The lamp shade is formed with a depression 64 across the top and on each side thereof to receive a U-shaped channel bar 65. The U-shaped channel 65 is secured to the lamp shade by two screws 66, one on each end thereof. The channel is assembled to the lamp shade with the open end of the U downwardly, thus providing a passageway, or tunnel, 67 for the necessary electrical connections between the brackets 56 and electric contacts to be hereinafter described. The channel 65 has mounted thereon a bracket 68 near the center of the shade. The bracket 68 is shown in perspective in Fig. 8, and this bracket 68 is provided with three openings 69 for securing it to the lamp shade 55. A notch 70 is formed on the upper side of the bracket 68 to receive the bracket 39. Each side wall of the notch 70 is recessed to receive a contact block 71 (Fig. 10), in each of which are mounted two spring-actuated contacts 72. The spring contacts 72 enter into countersunk openings 73 where they are held by an insulating plate 74 by screws 75. Springs 76 are held in contact with the ends of the contacts 72 by the plate 74 to give the contacts spring action. An electric contact plate 77 is connected to each contact 72 by means of a wire 78. Each block is assembled in the bracket 68 by two screws 781.

A toggle switch 79 is mounted in the bracket 68 to provide a means for turning the lamp on and off.

The assembled lamp shade is mounted on the bracket 39 by inserting the end of the bracket 39 into the notch 70 of the bracket 68 and securing them together by means of two screws 80. The spring contacts 72 are so located in the bracket 68 that when the shade is attached to the bracket 39 the spring contacts 72 come into contact with the fixed contacts 50 carried by the bracket 39.

A connector plate 81 (Figs. 12 and 13) is provided in the base of the machine for making the electrical contacts necessary for the operation of the lamp. A ballast 82 is also provided in the base of the machine as well as a starter 83. The connector block 81, the ballast 82, and the starter 83, are protected against accidental damage by a cover plate 84, which is secured to the underside of the base by three screws 85. An opening is provided in the side wall of the base in which is inserted an insulating grommet 86 for the cord for the electric source.

The novel lamp is so constructed as to provide a simple assembling and shipping arrangement. The lamp is shipped with the shade 55 disassembled from the bracket 39 and the bracket 39 is disassembled from the stand bracket 34. The cord 38 is given sufficient slack so that the bracket 39 may be tied on the stand and the lamp shade separately packed in the shipping box. Upon arrival at its destination the bracket 39 is first assembled to the stand by inserting the screws 43 and 44 and thereafter the lamp shade is assembled to the bracket 39 by means of the screws 80. No electrical connections need be made at the point of destination. The securing of the lamp 55 to the bracket 39 by screws 43, 44 and 80, completes the assembly of the lamp, together with electrical connections necessary for operating the lamp.

Wiring diagram

The circuits for operating the lamp are shown in Fig. 13. When the plug 90 is inserted in a convenience outlet a circuit is completed through the wire 91, contact block 81, wire 92, through the ballast 82, and from the ballast 82 to the contact block 81 by a wire 93. The wire 93 is connected to the fixed contact 50 on the bracket 39, and when the lamp shade is assembled to the bracket 39 the fixed contact 50 is electrically connected with the spring contact 72, which through wire 94 is connected to one of the electrodes of the fluorescent lamp 95. A wire 96 connects the other side of the electrode of the lamp 95 with a second spring contact 72 which is in contact with the fixed contact 50 and the latter being connected to a convenient post on the contact block 81 by a wire 97. The wire 97 is connected to the starter 83 by a wire 98, through the medium of the connector block 81. The other side of the starter is connected to the contact block 81 by a wire 99 which in turn is connected by a wire 100 to a third fixed contact 50. The fixed contact 50 through the spring contact 72 and wire 101 is connected to one side of the second electrode of the fluorescent lamp 95 which through a wire 102 is connected to the toggle switch 79. The toggle switch 79 closes a circuit through a wire 103 to the fourth spring contact 72 and a fixed contact 50 through lead 104 to the contact block 81 and by lead 105 back to the plug 90.

When the plug 90 is inserted into the outlet for the source of power and the switch 79 closed, the circuit will be closed to the starter 83, and after the lamp 95 is started the current flows through the ballast 82 in a manner well known in the art, to maintain the fluorescent lamp in its lighted condition.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a lamp of the class described, the combination of a standard, a bearing mounted on the upper end of the standard, a tubular collar encompassing the upper end of the standard and extending downwardly thereon, said tubular collar having its upper end closed and resting on said bearing; a recess in said bearing, means on said collar and extending into said recess, the recess being of a length to permit limited rotary movement of the collar on the bearing, a flat face on a vertical side of said collar, a bracket mounted on said flat face, and a lamp shade mounted on said bracket.

2. In a lamp of the class described, the combination of a tubular standard, a bearing mounted on the upper end of the tubular standard, a tubular collar encompassing the upper end of the tubular standard and resting on said bearing, a bracket on said collar, a lamp shade mounted on said bracket, securing members to secure the bracket to a vertical face on said collar, one of said securing members having an extension, and a recess in said bearing into which the said extension projects, said recess being of a length to permit limited rotary movement of the collar on said bearing.

JOHN W. JARRETT.
VINCENT MATERESE.

REFERENCES CITED

The following references are of record in the file of this patent:

UNITED STATES PATENTS

| Number | Name | Date |
| --- | --- | --- |
| 1,022,328 | Partridge | Apr. 2, 1912 |
| 1,092,450 | Perkins | Apr. 7, 1914 |
| 1,682,342 | Kraft | Aug. 28, 1928 |
| 1,844,651 | Halvorson | Feb. 9, 1932 |
| 1,879,343 | LaVigne | Sept. 27, 1932 |
| 1,889,978 | Dickey | Dec. 6, 1932 |
| 1,930,926 | Doane | Oct. 17, 1933 |
| 1,945,739 | Doane | Feb. 6, 1934 |
| 2,301,788 | Patton et al. | Nov. 10, 1942 |
| 2,305,721 | Livers | Dec. 22, 1942 |
| 2,308,986 | Livers | Jan. 19, 1943 |